United States Patent Office 3,734,928
Patented May 22, 1973

3,734,928
DIFUNCTIONAL IODONIUM SALTS OF DIPHENYL OXIDE AND PREPARATION
Zdravko Jezic, Midland, Mich., assignor to The Dow Chemical Company, Midland, Mich.
No Drawing. Filed Aug. 11, 1970, Ser. No. 63,005
Int. Cl. A61k 27/00; C07c 43/28; C07d 63/14
U.S. Cl. 260—332.2 R    13 Claims

ABSTRACT OF THE DISCLOSURE

Difunctional iodonium salts of diphenyl oxide corresponding to the formula

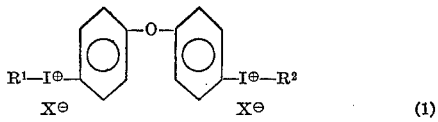

(1)

wherein $R^1$ and $R^2$ represent phenyl-, nitrophenyl-, fluorophenyl-, chlorophenyl-, bromophenyl-, loweralkylphenyl-, loweralkoxyphenyl-, trifluoromethylphenyl-, phenylphenyl-, phenokyphenyl-; disubstituted phenyl- in which the substituents are fluoro, chloro, bromo, loweralkyl, loweralkoxy; naphthyl; or 2-thienyl; and X represents fluoride, chloride, bromide, iodide, hydrogen sulfate, nitrate, trifluoroacetate, trichloroacetate, loweralkanoate, lactate or tetrafluoroborate. The compounds have antimicrobial properties.

BACKGROUND OF THE INVENTION

C. Willgerodt et al., Ber. (1904), 37, 1301 disclosed compounds having two iodonium groups corresponding to the following formula

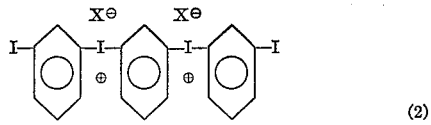

(2)

These compounds were prepared by reacting two moles of m-iodo iodosobenzene with one mole of m-diiodoxybenzene using silver oxide in water to carry out the condensation. The resulting hydroxide salt form was converted to the corresponding halide salt form using concentrated hydrogen halide.

Later, C. Willgerodt et al., Ber. (1909), 42, 3826, made the compounds

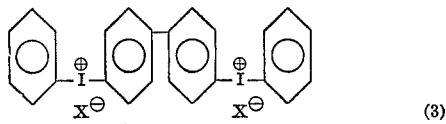

(3)

by condensing two moles of iodoxybenzene with one mole of 4,4'-diiodosodiphenyl using aqueous solver oxide as the condensing agent and converting the resulting hydroxide salt form to the corresponding halide in the usual manner.

Thereafter, R. A. Wiley et al., J. Med. Chem., 9 (1966), No. 2, 228, improved the process for making the immediately preceding compounds by using sodium hydroxide as the condensing agent and converting the resulting hydroxide salt form product to the corresponding iodide or bromide using sodium iodide or sodium bromide, respectively.

In U.S. patent application Ser. No. 733,234, filed May 31, 1968, Z. Jezic disclosed the preparation of (I-phenyl)-I'-phenyl-I,I'-(2,5-thiophenediyl)-bis(iodonium salts) by condensing a phenyl-2-thienyliodonium trifluoroacetate with a (diacetoxyiodo)benzene in the presence of sulfuric acid. The resulting bis(iodonium acid sulfates) are converted to other salt forms in usual ways.

SUMMARY OF THE INVENTION

The present invention is directed to the difunctional iodonium salts of diphenyl oxide, and their preparation, which salts correspond to the following formula

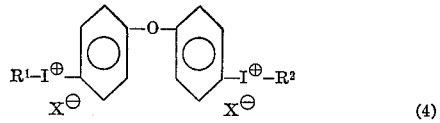

(4)

wherein $R^1$ and $R^2$ represent phenyl-, nitrophenyl-, fluorophenyl-, chlorophenyl-, bromophenyl-, loweralkylphenyl-, loweralkoxyphenyl-, trifluoromethylphenyl-, phenylphenyl-, phenoxyphenyl-; disubstituted phenyl- in which the substituents are fluoro, chloro, bromo, loweralkyl, loweralkoxy, naphthyl; or 2-thienyl; and X represents fluoride, chloride, bromide, iodide, hydrogen sulfate, nitrate, trifluoroacetate, trichloroacetate, loweralkanoate, lactate or tetrafluoroborate. The compounds have antimicrobial properties. The terms "loweralkyl" and "loweralkoxy" refer to groups containing from 1 to 4 carbon atoms, such as methyl, ethyl, propyl, butyl, methoxy, ethoxy, propoxy and butoxy. The term "loweralkanoate" refers to groups containing from 2 to 4 carbon atoms, such as acetate, propionate and butyrate. These compounds are crystalline solid materials which are somewhat soluble in polar organic solvents and in aqueous polar organic solvents at room temperature, the solubility increasing somewhat at elevated temperatures. Generally, they have good stability with the exception of the iodide salts which, like most iodide salts, are somewhat sensitive to light and should, therefore, be stored in a dark place. The compounds have been found to be of relatively high toxicity to a broad spectrum of bacteria, fungi, yeasts and small RNA viruses. It has been discovered, further, that the compounds are of low toxicity to terrestrial plants and may be applied thereto in bactericidal amounts to obtain excellent controls of the microbial organisms which attack the seeds, roots or above-ground portions of terrestrial plants. Such practice protects the terrestrial plants and seeds and improves crop yield and the emergence and growth of seedlings. Furthermore, the compounds may be included in adhesives, cooling waters, inks, plasticizers, latices, resinous polymeric materials, fuels, greases, soaps, detergents, shampoos, cutting oils and oil or latex paints to prevent mold and mildew and the degradation of such products resulting from microbial attack. Also, the compounds may be distributed in natural and synthetic textiles or fabrics, and paper or other cellulosic products, or may be employed in the impregnation of wood, lumber, wallboard and plaster to protect such products from the attack of the bacterial organisms of rot, mold, mildew and decay.

Representative symmetrical compounds of this invention are the oxydi-p-phenylene bis(iodonium salts) such as, for example, oxydi-p-phenylene bis(2-thienyliodonium salts) and the oxydi-p-phenylene bis(4-phenyliodonium salts) wherein the phenyl groups may be substituted in the manner indicated above. Representative unsymmetrical compounds of this invention are, for example, I-phenyl-I'-(2-thienyl) - I,I' - (oxydi-p-phenylene) bis(iodonium salts), wherein phenyl may be substituted as indicated above. Representative of the symmetrical oxydi-p-phenylene bis(iodonium salts) are, for example, those wherein each of the bis moieties is one of the following, the salt anion being omitted for brevity: 3-bromophenyl-, 3-nitrophenyl-, 2-phenylphenyl-, 4-trifluoromethylphenyl-, 4-phenoxyphenyl-, 2,4-dibromophenyl-, 2-butylphenyl-, 2,4-dimethylphenyl-, 4-butoxyphenyl-, 2-methylphenyl-, 2,4-dimethoxyphenyl-, 1-naphthyl-, 2-chloro-4- methoxyphenyl-, 3,5-dichlorophenyl-, 2-methyl-4-methoxyphenyl-, 3-bromo-4-methoxyphenyl-, 3-chloro-4-methylphenyl-, 3-trifluoromethylphenyl-, 2,4-dimethoxyphenyl-, 2-bromo-4-chlorophenyl-, 4-ethoxyphenyl-, 2,5-dibromophenyl-, 4-fluorophenyl-, and 3,4-dimethylphenyl-. Such substituted phenyl moieties also are moieties of the I-phenyl-I'-(2-thienyl) - I,I' - (oxydi-p-phenylene) bis(iodonium salts). The oxydi-p-phenylene bis(2-thienyliodonium salts) have no additional thienyl ring substituents. The salt forms of these difunctional iodonium compounds are the fluoride, chloride, bromide, iodide, hydrogen sulfate, nitrate, trifluoroacetate, trichloroacetate, acetate, propionate, butyrate, lactate and tetrafluoroborate.

The symmetrical oxydi-p-phenylene bis(iodonium trifluoroacetate) salts are prepared by reacting together an RH compound wherein $R=R^1=R^2$ ($R^1$ and $R^2$ being defined above) and bis[4-(diacetoxyiodo)phenyl]ether in the presence of acetic anhydride as a reaction medium and trifluoroacetic acid (or concentrated sulfuric acid) as a condensing agent at an acetic acid byproduct forming temperature, according to the following equation:

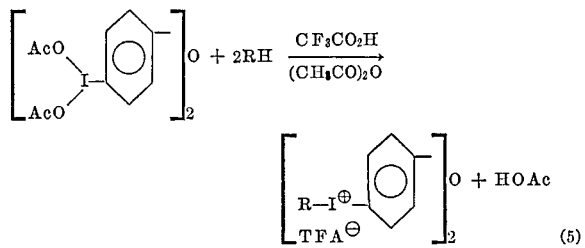

wherein TFA represents the trifluoroacetate anion; and wherein $HSO_4^\ominus$ is the anion when concentrated sulfuric acid is the condensing agent. The reaction goes forward when the reagents are employed in any amounts. The reaction consumes the reagents in proportions of two moles of thiophene or benzene or a substituted benzene suitable for electrophilic substitution, to one mole of bis[4-(diacetoxyiodo)phenyl] ether and the use of amounts which represent substantially such proportions is preferred. The reaction proceeds under temperatures of from about minus 30° to about plus 10° and is preferably carried out at temperatures of from about minus 15° to plus 5° C. Upon completion of the reaction, the desired oxydi-p-phenylene bis(iodonium trifluoroacetate or hydrogen sulfate) is separated by conventional procedures.

In a convenient method of carrying out the reaction, trifluoroacetic acid and (diacetoxyiodo)phenyl ether are brought together in the reaction medium and the thiophene or benzene or substituted benzene suitable for electrophilic substitution is added portion wise thereto with agitation. The reaction is exothermic and goes forward readily with the addition of the RH reagent. The temperature of the reaction mixture is controlled by regulating the rate of addition of the RH reagent and by external cooling. The reaction essentially is complete upon completion of the addition of the RH reagent. Allowing the resulting mixture to stand for a period of time at somewhat elevated temperatures up to room temperature with continued stirring oftentimes gives some improvement in yield. Upon completion of the reaction, the reaction mixture may be distilled under reduced pressure to remove volatile components and obtain the desired bis(iodonium trifluoroacetate) as a residue. This residue is treated with acetone in combination with a small proportion of petroleum ether boiling at 60° to 70° C. The crude product resulting is then recrystallized from pyridine.

The bis(iodonium chloride), bromide and iodide salts are prepared from the corresponding trifluoroacetate or trichloroacetate salts by treatment with an appropriate gaseous or aqueous hydrogen halide. The reaction of the trifluoroacetate or trichloroacetate salt with the hydrogen halide preferably is carried out in a liquid reaction medium, conveniently in an organic solvent such as alcohol, acetone or ethyl acetate. The amounts of the reagents to be employed are not critical, some of the desired iodonium halide being obtained when employing the reagents in any proportions. However, the reaction consumes the reagents in substantially equimolecular proportions and the use of the reagents in amounts which represent such proportions is preferred. The reaction takes place readily at temperatures of from 0° to 50° C. with the production of the desired iodonium halide and trifluoroacetic or trichloroacetic acid of reaction. During the reaction, the halide salt usually precipitates in the reaction mixture as a crystalline solid. The bis(iodonium halide) so prepared may be separated by decantation or filtration, and further purified by recrystallization from various organic solvents or aqueous organic solvents such as alcohols, dimethylformamide, dimethylsulfoxide and the like.

The bis(iodonium acetate), propionate, butyrate, nitrate, lactate and tetrafluoroborate may be prepared from the corresponding halides and conveniently from the corresponding chloride. In such operations, the corresponding bis(iodonium halide) is treated with silver nitrate, silver lactate, silver tetrafluoroborate or the silver salt of a lower alkanoic acid in water as reaction medium. The reaction takes place readily with the production of the desired iodonium salt product and silver halide. The methods of contacting the reagents and conditions of reaction are as described in the preceding paragraph. Upon completion of the reaction, the desired salt product is separated by decantation or filtration.

The bis(iodonium fluoride) salt is prepared by reacting the bis(iodonium hydrogen sulfate) with barium hydroxide in water or aqueous organic solvents, as reaction medium. The reaction takes place readily with the production of the desired bis(iodonium hydroxide) salt product and barium sulfate. The resulting barium sulfate is filtered off and the filtrate is treated with hydrofluoric acid to give the desired fluoride salt.

The acid sulfate salt is prepared by substituting concentrated sulfuric acid as condensing agent in place of the trifluoroacetic acid condensing agent.

The unsymmetrical bis(iodonium salts) of this invention are prepared by reacting together 4-phenoxyphenyl-2-thienyliodonium trifluoroacetate or trichloroacetate and diacetoxyiodobenzene wherein the benzene nucleus may be additionally substituted, as indicated above, in the presence of acetic anhydride as a reaction medium and concentrated sulfuric acid as a condensing agent at an acetic acid byproduct forming temperature, according to the following equation:

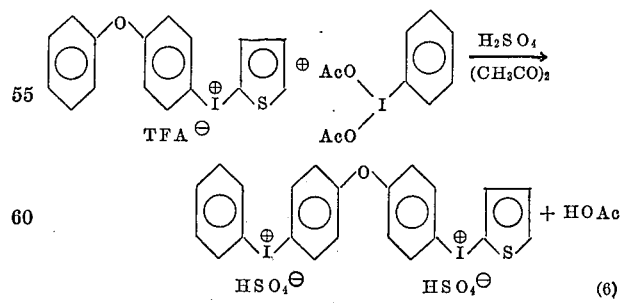

The reaction goes forward when the reagents are employed in any amount. The reaction consumes the reagents in proportions of equimolar amounts of 4-phenoxyphenyl-2-thienyliodonium trifluoroacetate and diacetoxyiodobenzene or a substituted diacetoxybenzene and the use of amounts which represent substantially such proportions is preferred. The reaction proceeds under temperatures of from about minus 30° to about 0° C. and is preferably carried out at temperatures of from about minus 25° to minus 5° C. Upon completion of the reaction, the desired I-phenyl-I'-(2-thienyl)-I,I' - (oxydi-p-phenylene)bis)iodonium acid sulfate) is separated by conventional procedures.

In a convenient method of carrying out the reaction, a suspension of the reagents in acetic anhydride is reacted with concentrated sulfuric acid, gradually added with agitation. The reaction is exothermic and goes forward readily with the addition of the sulfuric acid. The temperature of the reaction mixture is controlled by regulating the rate of addition of the sulfuric acid and by external cooling. The reaction essentially is complete upon completion of the addition of the sulfuric acid. Allowing the resulting mixture to stand for a period of time at somewhat elevated temperature up to room temperature with continued stirring oftentimes gives some improvement in yield. Upon completion of the reaction, the reaction mixture is poured into cold water with external cooling and diluted with acetone. The resulting solution is treated with aqueous barium hydroxide until neutral. The resulting barium sulfate is filtered off, washed with warm water and the clear filtrate treated with a small excess of 85% lactic acid to form the bis(iodonium lactate) salt. The product is isolated by removing the solvent and may be purified further by crystallization from a suitable solvent. Other salt forms are prepared in ways described for the preparation of the symmetrical bis(iodonium salts), as described above.

In connection with the preparation of the above-described symmetrical difunctional iodonium salts, a new intermediate was prepared, bis[4-(diacetoxyiodo)phenyl] ether, corresponding to the formula

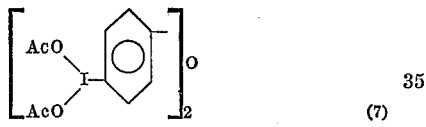

(7)

In the formula, Ac represents the acetyl group, $CH_3CO-$. In addition to being useful as an intermediate in the preparation of the stated difunctional iodonium salts, the compound is an oxidizing agent.

The bis[4-(diacetoxyiodo)phenyl]ether is prepared by reacting together 4,4'-diiododiphenyl ether with peracetic acid, advantageously as a 40% solution in acetic acid, according to the following equation:

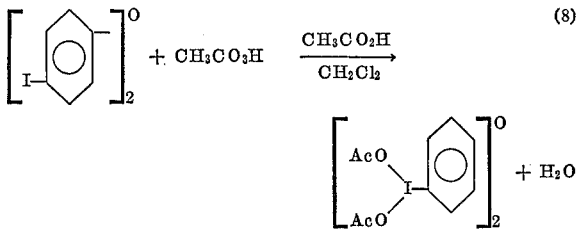

(8)

The reaction is preferably carried out in methylene chloride as the reaction medium. The reaction goes forward when the reagents are employed in any amounts. Advantageously, a slight excess of peracetic acid is used. The reaction proceeds at a water-byproduct forming temperature, advantageously from about 10° to 40° C. and preferably at a temperature between about 20° and about 30° C. Upon completion of the reaction, the desired bis [4-(diacetoxyiodo)phenyl]ether is separated by conventional procedures.

In a convenient method of carrying out the reaction, peracetic acid is added to a stirred solution of the 4,4'-diiododiphenyl ether in methylene chloride. The reaction is exothermic and goes forward readily with the addition of the peracetic acid. The temperature of the reaction mixture can be controlled by regulating the rate of the addition of peracetic acid to the reaction medium and by external cooling. Allowing the resulting mixture after addition of the peracetic acid to stand for a period of time at room temperature drives the reaction to completion and oftentimes gives some improvement in yield. Upon completion of the reaction, volatile components are blown off with air at room temperature and the yellowish solid residue, bis[4-(diacetoxyiodo)phenyl]ether is recovered. The residue may be further purified by suspension in water, filtration, washing with water and drying in vacuo first at room temperature and then at 35° C. The purified product is recoverable in yields of about 90 percent and higher based on 4,4'-diiododiphenyl ether reagent. The product is identified by carbon, hydrogen and iodine analyses and by infrared spectral analysis.

The following examples describe completely representative specific embodiments and the best modes contemplated by the inventor for carrying out the invention. Temperatures given are in centigrade degrees.

Example 1.—Bis[4-(diacetoxyiodo)phenyl]ether

To a stirred solution of 10.6 g. (0.025 mole) of 4,4'-diiododiphenyl ether in 125 ml. of methylene chloride is added 17.2 ml. (0.132 mole) of 40% peracetic acid at 30° over a period of 25 minutes. Stirring is continued for 2 hours and 35 minutes, volatile components are blown off with air at room temperature and the yellowish solid residue is suspended in 100 ml. of water. The suspension is filtered, washed with water and dried in vacuo first at room temperature and then at 35°. When dry the product weighs 15.3 g. (93.6% yield, diiododiphenyl ether basis). It melts over the range of 154°–9° (dec.). Infrared spectrum (Nujol® mull) shows a carbonyl band at ca. 1645 cm.$^{-1}$ characteristic for diacetoxyiodo compounds.

Example 2.—Oxydi-p-phenylene bis(2-thienyliodonium trifluoroacetate)

To a suspension of 13.2 g. (0.02 mole) bis[4-(diacetoxyiodo)phenyl]ether in 75 ml. of acetic anhydride add 15.5 ml. (0.2 mole) of trifluoroacetic acid at minus 20°. The suspension, now more fluid, is treated at minus 20° to minus 25° with 6.8 g. (0.08 mole) of thiophene in 15 ml. of acetic anhydride over a period of 30 minutes. As soon as the addition of thiophene starts, a characteristic dark purple color is noticed. Stirring is continued for 1.5 hours longer, cooling is discontinued and the reaction mixture is brought to room temperature. The volatile components are removed under reduced pressure (water bath temp. 50°–60°, ca. 25 mm. Hg), the residue is diluted with acetone, boiled for 10 minutes with charcoal and filtered using Celite filter aid. The yellowish-orange filtrate is treated with a small volume of petroleum ether (B.R. 60°–70°) and soon product crystallizes out. The mother liquor containing more product is saved and used for the preparation of the corresponding chloride and bromide salts. Crude product is crystallized from pyridine to give an off-white solid, melting at 158°–60° (dec.).

*Analysis.*—Calculated for $C_{24}H_{14}F_6I_2O_5S_2$, percent: C, 35,39; H, 1.73; I, 31.17. Found, percent: C, 36.45; H, 2.21; I, 30.6.

Mass spectrometric analysis ($CH_4$, direct probe method) shows that the sample contains some solvent of recrystallization (see elemental analysis) and is entirely consistent with the assigned structure.

Example 3.—Oxydi-p-phenylene bis(2-thienyliodonium chloride)

The acetone-petroleum ether mother liquor from the isolation of the trifluoroacetate salt of Example 2 is treated with one ml. of concentrated hydrochloric acid, stirred for 10 minutes and left in a refrigerator overnight. The resulting off-white solid is filtered, washed with acetone and dried at room temperature in vacuo. The resulting crude product is recrystallized from 80% aqueous ethanol to give a crystalline product, M.P. 172°–3° (dec.).

*Analysis.*—Calculated for $C_{20}H_{14}Cl_2I_2OS_2$, percent: C, 36.43; H, 2.14; I, 38.5. Found, percent: C, 36.45; H, 2.54; I, 38.0.

Mass spectrometric analysis ($CH_4$, direct probe method) is consistent with the assigned structure.

Example 4.—Oxydi-p-phenylene bis(2-thienyliodonium bromide)

Oxydi-p-phenylene bis(2-thienyliodonium bromide) is prepared in a similar manner as the chloride, using the mother liquor from the isolation of the trifluoroacetate product and treating it with aqueous concentrated HBr. The resulting crude product is recrystallized from 80% aqueous ethanol to give a white product melting at 159°–62° (dec.). Almost identical infrared features (split mull) are observed as for the corresponding chloride.

Example 5.—Oxydi-p-phenylene bis(4-methoxyphenyl-iodonium bromide)

Procedure A.—13.2 grams (0.02 mole) of bis[p-(diacetoxyiodo)phenyl]ether is suspended in 75 ml. of acetic anhydride and to the suspension is added with stirring 8.7 g. (0.08 mole) of anisole dissolved in 25 ml. of acetic anhydride and then 15.5 ml. (0.2 mole) of trifluoroacetic acid while the mixture is kept at minus 30°. The addition of anisole is completed in ca. 30 minutes, and the reaction mixture, now a dark purplish-blue color, is stirred at minus 30° for half an hour longer. Cooling is then discontinued and the reaction mixture is gradually warmed up to room temperature while stirring for ca. 3 hours. Stirring is then stopped and the reaction mixture is allowed to stand at room temperature for several hours. Volatile components are removed under reduced pressure and moderate heating (ca. 25 mm. Hg/50°–60°), the residue is diluted with acetone, charcoal is added and the suspension is boiled for ca. 10 minutes and filtered. The clear filtrate is orange-red colored. It is treated with an excess of aqueous 48% hydrobromic acid and stirred for 15 minutes. An off-white precipitate is formed, filtered off, washed with acetone and dried. Crude product is obtained, M.P. 147°–52° (dec.). It is recrystallized from 75 ml. of dimethylformamide. White recrystallized product melts at 147°–9° (dec.).

Procedure B.—A mixture consisting of 13.2 g. (0.02 mole) bis[p-diacetoxyiodo)phenyl]ether and 8.7 g. (0.08 mole) anisole in 100 ml. of acetic anhydride is stirred at minus 30° and treated dropwise with 2.8 ml. (ca. 0.05 mole) concentrated sulfuric acid (0.01 mole excess) over a period of 10 minutes. As soon the addition is started, an intensive dark bluish-purple coloration of the reaction mixture is noticed. Stirring at minus 30° is continued for 50 minutes longer, cooling is discontinued and the reaction mixture is stirred for an additional hour at room temperature. Volatile components are then removed under reduced pressure (water bath temp., ca. 50°). The residue is dissolved in concentrated formic acid (100 ml.) and treated with an excess of 48% hydrobromic acid with stirring to give an off-white precipitate which is filtered off, well washed with acetone and dried at room temperature in vacuo. The crude product melts over the range 144°–9° (dec.). When the crude product is recrystallized from 75 ml. of dimethylformamide, a white crystalline product melting at 151°–3° (dec.) is obtained.

Both mass spectrometric analysis ($CH_4$, direct probe method) and IR analysis (split mull) confirm the assigned structure of the products of Procedures A and B.

Example 6.—I-phenyl-I'-(2-thienyl)-I,I'-(oxydi-p-phenylene)bis(iodonium chloride)

12.1 grams (0.025 mole) 4-phenoxyphenyl-2-thienyl-iodonium trifluoroacetate and 8.1 g. (0.025 mole) of (diacetoxyiodo)benzene suspended in 100 ml. of acetic anhydride is treated at minus 25° with 14 ml. (ca. 0.025 mole) concentrated sulfuric acid (400% excess) over a period of 40 minutes. Reddish-brown color formation is noticed as the sulfuric acid is run in and the suspension soon disappears as the reactants dissolve. After the addition of sulfuric acid is completed, the reaction mixture is stirred at minus 25° for one hour longer, the cooling bath is removed and stirring at room temperature continued for 2 hours. The reaction mixture is then poured into 250 ml. of cold water with external cooling and the mixture is transferred into a 500 ml. volumetric flask and diluted with acetone to the mark.

A 100 ml. aliquot (0.005 mole) of the 500 ml. dilution is treated with 5 ml. of concentrated hydrochloric acid added dropwise with stirring. After ca. 10 minutes of stirring, a crystalline solid slowly precipitates out. Over a period of one hour, 350 ml. of acetone is gradually added thereto, the precipitate is filtered off, washed with acetone and dried at room temperature. Finally it is dried at 60° in vacuo; M.P. 166°–8° (dec.).

Mass spectrometric analysis (CEC 21–110B, direct probe) shows characteristic masses corresponding to di-substituted diphenyl oxide, mono-substituted benzene and mono-substituted thiophene, indicative for the titular difunctional iodonium compound of this example.

Example 7.—I-phenyl-I'-(2-thienyl)-I,I'-(oxydi-p-phenylene)bis(iodonium nitrate)

A 100 ml. aliquot (0.005 mole) of the corresponding hydrogen sulfate salt solution of Example 6 is diluted with water to 250 ml. and treated with 13 g. (0.05 mole) of barium nitrate in 150 ml. of water. Barium sulfate is immediately formed. The stirred suspension is warmed up to ca. 50° and filtered; the precipitate is well washed with water and filtrate and washings are combined. The resulting solution is evaporated to a smaller volume under reduced pressure at 60° to 70°. The yellowish concentrated solution crystallizes upon standing. Product is filtered off, washed with ether and dried in vacuo at room temperature. Resulting product melts at 175°–7° (dec.).

The 60 and 100 mHz. NMR spectra in $d_6$-dimethylsulfoxide are consistent with the structure based upon the following assignments:

Shifts of phenyl protons:          Couplings, Hz.
  Ortho to $I^{\oplus}$—8.28 p.p.m.           $J \approx 8.9$
  Meta to $I^{\oplus}$—7.16 p.p.m.            $J \approx 8.9$
  (Ortho to —O—) 3,4,5—7.58 p.p.m.     $\approx 8.9$ Shifts of thiophene protons:       Couplings, Hz.
  H(3)—8.07 p.p.m.                 J(34) 3.8
  H(4)—7.17 p.p.m.                 J(35) 1.3
  H(5)—7.96 p.p.m.                 J(45) 5.4

It should be noted that the shifts and couplings of thiophene protons are almost identical with the corresponding values found for the starting material, 4-phenoxyphenyl-2-thienyliodonium trifluoroacetate.

Example 8.—I-phenyl-I'-(2-thienyl)-I,I'-(oxydi-p-phenylene)bis(phenyliodonium bromide)

A 100 ml. aliquot (0.005 mole) of the corresponding hydrogen sulfate salt solution of Example 6 is treated with 5 ml. of 48% hydrobromic acid dropwise with stirring over a period of ca. 5 minutes. Almost immediately a white precipitate is formed; 200 ml. of acetone is added, product is filtered off, washed with acetone and dried at room temperature in vacuo and then at ca. 60°. The product melts at 173°–6° (dec.).

The structure is supported by 60 and 100 mHz. NMR spectra in $d_6$-dimethylsulfoxide, similarly as for the corresponding nitrate.

Example 9.—I-phenyl-I'-(2-thienyl)-I,I'-(oxydi-p-phenylene)bis(iodonium iodide)

A 100 ml. aliquot (0.005 mole) of the corresponding hydrogen sulfate salt solution of Example 6 is treated with 3.5 ml. of 47% hydriodic acid, dropwise, with stirring over a period of 5 minutes. A yellowish precipitate is formed. It is filtered off, washed with acetone and dried first at room temperature in vacuo and then at ca. 60°. The product is protected against light during the drying procedure by wrapping the vial containing it in aluminum foil. Its M.P. is 119°–22° (dec.). Due to its sensitivity to light, product sample is stored in darkness. The structure of the iodide salt is supported by 60 and 100 mHz. NMR spectra in $d_6$-dimethylsulfoxide. The spectra obtained are well in accord with the ones observed for the other salts from this series.

Example 10.—Oxydi-p-phenylene bis(2,4-dimethoxyphenyliodonium bromide)

A suspension of bis[4 - (diacetoxyiodo)phenyl]ether (26.4 g., 0.04 mole) in 200 ml. of acetic anhydride and m-dimethoxybenzene (22.2 g., 0.16 mole) is stirred at ca. minus 30° and to the suspension is added dropwise concentrated sulfuric acid (5.6 ml., 0.1 mole, ca. 0.02 mole excess) over a period of ca. 10 minutes. The color of the reaction mixture immediately turns dark green upon addition of the sulfuric acid. Stirring at minus 30° is continued for 50 minutes longer. The cooling bath of isopropanol and Dry Ice® is removed and stirring is continued while the temperature of the reaction mixture is gradually increased to room temperature over a period of about 3 hours. The reaction mixture is then treated with a large volume of acetone, precipitated material is filtered off, suspended in water and treated with aqueous 48% HBr. The resulting product is stirred for one hour, filtered, washed with acetone and dried overnight. A light tan product is obtained, melting over a range of 139°–155° (dec.). The IR spectral features are consistent with the structure of the titular compound.

Example 11

In similar procedures, compounds corresponding to the following formulas are prepared:

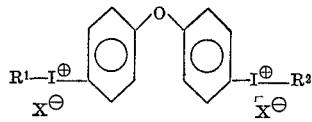

| R¹ | R² | X | Mol. wt |
|---|---|---|---|
| 1-naphthyl | 2-thienyl | Cl | 703.16 |
| 4-nitrophenyl | do | TFA | 853.25 |
| 4-n-butylphenyl | 4-n-butyl | Acetate | 806.48 |
| 4-n-propoxyphenyl | 4-n-propoxyphenyl | Propionate | 838.48 |
| 3-trifluoromethylphenyl | 2-thienyl | Butyrate | 793.34 |
| 4-phenylphenyl | 4-phenylphenyl | TFA | 1,053.11 |
| 4-phenoxyphenyl | 4-phenoxyphenyl | Cl | 831.27 |
| 3,4-difluorophenyl | 2-thienyl | TFA | 844.23 |
| 3,4-dichlorophenyl | Phenyl | Cl | 715.97 |
| 3,4-diethylphenyl | 2-thienyl | Br | 798.15 |
| 3,4-dichlorophenyl | 4-ethoxyphenyl | Tetrafluoroborate | 862.74 |
| Do | do | HSO₄ | 883.26 |
| Do | do | Lactate | 867.26 |
| Phenyl | Phenyl | HSO₄ | 770.32 |

The compounds of the present invention are useful as antimicrobial agents, i.e., they are highly toxic toward many bacterial and fungal organisms or plants including gram-negative and gram-positive types such as *Staphylococcus aureus*, *Salmonella typhosa*, *Bacillus subtilis*, *Escherichia coli*, *Pseudomonas aeruginosa*, *Mycobacterium phlei*, *Candida pelliculosa*, *Candida albicans*, *Aspergillus terreus*, *Aerobacter aerogenes*, *Trichophyton mentagrophytes*, *Bremia lactucae*, *Cephaloascus fragans*, *Ceratocystis ips*, *Trichoderm sp.* Madison P–24 and *Pullularia pullulans*. Some of the compounds of the present invention are also viricidal against small RNA viruses. Such teaching is not to be construed to the end that the compounds are equivalent for the control of a particular organism or virus or that they are all equally effective at the same concentration.

The compounds may be applied to many bacterial plants and their habitats in bactericidal amounts to obtain excellent controls of the microbial organisms which attack the seeds, roots or above-ground portions of terrestrial plants. For such uses, the unmodified compounds can be employed. The compounds can also be dispersed on an inert finely divided solid and employed as dusts. Such mixtures can also be dispersed in water with or without the aid of a surface active agent and employed as sprays. In other procedures, the compounds can be employed as active constituents in solvent solutions, aqueous dispersions or oil-in-water and water-in-oil emulsions. Good results are obtained with methods employing and compositions containing microbicidal or antimicrobial amounts of the novel compounds. Preferred compositions contain from 0.001 to 50 percent by weight of compound. The compounds may be included in adhesives, cooling waters, inks, plasticizers, latices, polymers, resins, fuels, greases, soaps, detergents, cutting oils and oil or latex paints to prevent mold and mildew and the degradation of such products resulting from microbial attack. Also, the compounds advantageously may be distributed in textiles, fabrics, and paper or other cellulosic products, or may be employed in the impregnation of wood, lumber, wallboard and plaster to protect such products from the attack of the bacterial organisms of rot, mold, mildew and decay.

In representative operations, each of (oxydi-p-phenylene)-bis(2-thienyliodonium chloride), the corresponding trifluoroacetate, I-phenyl-I'-(2 - thienyl - I,I' - (oxydi-p-phenylene)-bis(iodonium nitrate) and (oxydi-p - phenylene)-bis(p-methoxyphenyliodonium bromide) gives complete kills and controls of *Staphylococcus aureus*, *Escherichia coli*, *Candida albicans*, *Salmonella typhosa*, *Trichophyton mentagrophytes*, *Bacillus subtilis*, *Mycobacterium phlei*, *Aspergillus terreus*, *Pullularia pullulans*, *Rhizopus nigricans*, *Ceratocystis ips*, *Cephaloascus fragans* and *Trichoderm sp.* Madison P–42 when employed in nutrient broth at a concentration of 500 parts per million by weight.

In further operations, (oxydi - p - phenylene)bis-(2-thienyliodonium trifluoroacetate) inhibited growth of Bacteriophage MS–2, i.e., was active against small RNA viruses, when employed in nutrient agar at a concentration of 10 parts per million by weight.

The 4,4'-diiododiphenyl ether starting material for the preparation of bis[4-(diacetoxyiodo)phenyl]ether is prepared by reacting together diphenyl ether and iodine monochloride in the presence of glacial acetic acid as reaction medium. In a convenient method of carrying out the reaction, a solution of 250 g. (1.47 moles) of diphenyl ether in 450 ml. of glacial acetic acid is stirred under reflux and treated with 500 g. (ca. 3 moles) of iodine monochloride dropwise over a period of one hour. An efficient scrubber at the top of the condenser absorbs HCl evolved during the reaction. During the addition of iodine monochloride, the reaction mixture temperature is maintained at 20° to 25° by means of a water bath. After the addition, the reaction mixture becomes very dense and 450 ml. of glacial acetic acid is added. After stirring at room temperature for 5 hours, the reaction mixture temperature is increased to ca. 95° and stirring is continued for 1.5 hours. The reaction mixture is then kept overnight at room temperature, cooled in an ice bath and filtered. A quantity of 150 ml. of glacial acetic acid is used to transfer the material and to wash the product on the filter. The filtrate is poured onto 2 kg. of ice and extracted with methylene chloride, washed with water, sodium bisulfite solution and water. After removal of the methylene chloride, an oily residue is obtained. Product on the filter is dissolved in 1200 ml. of methylene chloride, the solution is treated just as the extract previously mentioned, and a white crystalline solid is obtained as the main product, M.P. 138°–9°. The oily residue upon distillation gives crude 4-iododiphenyl ether byproduct and 4,4'-diiododiphenyl ether as a residue.

The 4 - phenoxyphenyl - 2 - thienyliodonium trifluoroacetate starting material for the preparation of the unsymmetrical bis(iodonium salts) of this invention is prepared by reacting 4-(diacetoxyiodo)diphenyl ether with thiophene in the presence of acetic anhydride as solvent and trifluoroacetic acid as condensing agent. In a convenient method of carrying out the reaction, a suspension of 103.8 g. (0.25 mole) of 4-(diacetoxyiodo)diphenyl ether in 200 ml. of acetic anhydride is treated with 77.5 ml. of trifluoroacetic acid with stirring at minus 25°. A light tan solution is obtained which is then treated with 42 g. (0.5 mole) of thiophene in 125 ml. of acetic anhydride over a 1.5 hour addition period under the same conditions. Stirring at minus 25° is continued for 1.5 hours further, cooling is discontinued and the reaction mixture is stirred at room temperature for several hours. The volatile components are removed, the dark oily residue is treated with 500 ml. of ether and then slowly with n-heptane. A dark brown oily material separates out which, upon scratching the inside walls of the reaction vessel with a glass rod and cooling, gradually solidifies. A grayish solid resulting is filtered off, washed with ether/n-heptane mixture in proportions of 2 to 1 of the former to the latter, then dried at room temperature to give crude product. Recrystallization from benzene/n-heptane of an off-white crystalline material is obtained, M.P. 115°–7° (dec.).

The 60 and 100 mHz. NMR spectra in $d_6$-dimethylsulfoxide are entirely consistent with the structure of the titular compound.

What is claimed is:
1. A compound corresponding to the formula:

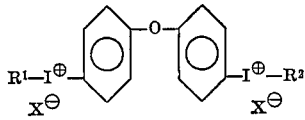

wherein $R^1$ and $R^2$ represent a phenyl-, nitrophenyl-, fluorophenyl-, chlorophenyl-, bromophenyl-, loweralkyl phenyl-, loweralkoxy phenyl-, (trifluoromethyl)phenyl-, phenylphenyl-, phenoxyphenyl-; disubstituted phenyl- in which the substituents are fluoro, chloro, bromo, loweralkyl, loweralkoxy; naphthyl; or 2-thienyl group; and X represents a fluoride, chloride, bromide, iodide, hydrogen sulfate, nitrate, trifluoroacetate, trichloroacetate, loweralkanoate, lactate or tetrafluoroborate anion.

2. The compound of claim 1 wherein $R^1$ and $R^2$ each represents 2-thienyl.

3. The compound of claim 2 wherein X represents trifluoroacetate.

4. The compound of claim 2 wherein X represents chloride.

5. The compound of claim 2 wherein X represents bromide.

6. The compound of claim 1 wherein $R^1$ and $R^2$ each represents 4-methoxyphenyl and X represents bromide.

7. The compound of claim 1 wherein $R^1$ and $R^2$ each represents 2,4-dimethoxyphenyl and X represents bromide.

8. The compound of claim 1 wherein $R^1$ represents phenyl and $R^2$ represents 2-thienyl.

9. The compound of claim 8 wherein X represents nitrate.

10. The compound of claim 8 wherein X represents bromide.

11. The compound of claim 8 wherein X represents iodide.

12. The compound of claim 8 wherein X represents chloride.

13. The compound bis[4-diacetoxyiodo)phenyl]ether.

References Cited
UNITED STATES PATENTS 3,422,152   1/1969   Doub _____ 260—612

OTHER REFERENCES

Beringer et al., J. A. C. S. 81: 342–51 (1959).
Neilands, Chem. Abs. 62: 7661–2 (1965).

HENRY R. JILES, Primary Examiner
C. M. S. JAISLE, Assistant Examiner

U.S. Cl. X.R.

260—332.3 R, 350, 535 R, 539 A, 540; 200—612 R, 613 R; 424—275, 317, 340, 341